(12) United States Patent
Jeng

(10) Patent No.: US 11,347,547 B2
(45) Date of Patent: May 31, 2022

(54) SYSTEMS AND METHODS FOR RATE LIMITING OF PROCESSING SYSTEMS

(71) Applicant: Walmart Apollo, LLC, Bentonville, AR (US)

(72) Inventor: Menkae Jeng, San Jose, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 123 days.

(21) Appl. No.: 16/812,991

(22) Filed: Mar. 9, 2020

(65) Prior Publication Data
US 2021/0279100 A1 Sep. 9, 2021

(51) Int. Cl.
*G06F 9/46* (2006.01)
*G06F 9/48* (2006.01)
*G06F 9/50* (2006.01)

(52) U.S. Cl.
CPC .......... *G06F 9/4887* (2013.01); *G06F 9/5083* (2013.01)

(58) Field of Classification Search
CPC .............................. G06F 9/4887; G06F 9/5083
See application file for complete search history.

(56) References Cited

U.S. PATENT DOCUMENTS

| | | | |
|---|---|---|---|
| 7,065,766 B2* | 6/2006 | Brenner | G06F 9/5088 718/103 |
| 2008/0031222 A1 | 2/2008 | Nanda et al. | |
| 2008/0031224 A1 | 2/2008 | Nanda et al. | |
| 2012/0324000 A1 | 12/2012 | Kang et al. | |
| 2013/0239119 A1* | 9/2013 | Garg | G06F 9/5083 718/105 |
| 2016/0125420 A1 | 5/2016 | Wheeler | |
| 2017/0099228 A1 | 4/2017 | Hunsperger et al. | |
| 2019/0268442 A1* | 8/2019 | Puniani | G06F 9/54 |

* cited by examiner

Primary Examiner — Gregory A Kessler
(74) Attorney, Agent, or Firm — Bryan Cave Leighton Paisner LLP

(57) ABSTRACT

Systems and methods including one or more processors and one or more non-transitory storage devices storing computing instructions configured to run on the one or more processors and perform acts of receiving one or more processing requests; assigning each respective processing request of the one or more processing requests to a respective queue of one or more queues; assigning each respective queue of the one or more queues to a respective processing node of one or more processing nodes; calculating a respective processing request backlog for each respective processing node of the one or more processing nodes; and limiting a processing rate of the respective processing node for processing requests of the one or more processing requests of the respective queue based on the respective processing request backlog for the respective processing node. Other embodiments are disclosed herein.

20 Claims, 7 Drawing Sheets

```
d = G - Gi
if d > 0,  // The node can allocate a range by computing the beginning of the range
("begin") and the end of the range ("end").
    begin = G modulo M
    if (d > s)
        end = begin - s + 1
    else
        end = begin - d + 1
    if (R > 0)
        decrement end
        decrement R
    decrement G by (begin - end + 1)
else
    G = G // The node does not find anything (e.g., d ≤ 0), set G as the current G value.
This situation can happen when $N_i$ > M.
```

FIG. 8

SYSTEMS AND METHODS FOR RATE LIMITING OF PROCESSING SYSTEMS

TECHNICAL FIELD

This disclosure relates generally to processing systems, and more particularly to limiting processing rates of processing systems.

BACKGROUND

Many processing systems enforce rate limits on processing speed (i.e. processing rate) and/or an amount of data processed (either in total or over a period of time) for a number of reasons. For example, processing rates can be limited to prevent excessive wear and tear on system hardware and/or as part of a processing service provider (e.g., cloud computing) business model. Generally, users of these systems are required to throttle their processing rate under these limits to avoid having their request rejected or overage fees applied.

Many rate limiting systems and methods exist today. Some track the aggregated request processing rate from all processing nodes, and then reject requests when the aggregated processing rate exceeds a global limit. For example, the fixed window counter approach initializes a shared counter at the beginning of every rate limiting window. When a processing node receives a new request, it performs an atomic decrement, queries the shared counter, and then accepts or rejects the new request based on the counter's value.

Many other existing rate limiting systems and methods enforce rate limits by using buckets of tokens or counters to track inbound requests when they arrive, and then reject new requests if the token or counter exceeds a predetermined limit. Exemplary token/counter algorithms can include a token bucket algorithm, a leaky bucket algorithm, a fixed window counter algorithm, a sliding window log algorithm, or a sliding window counter algorithm. In systems with multiple processing nodes running token/counter algorithms, every node needs to know the overall request statistics to enforce the rate limit at the whole cluster level. Many of these systems use shared counters, where every processing node must read/update the shared buckets or counters to enforce the rate limit. These systems, though, suffer due to their reliance on the token/counter, which can lead to uneven distribution of processing requests among nodes. This problem can be exacerbated when a processing node fails, as the requests from the failed node must then be distributed among the working nodes, thereby furthering the uneven distribution of requests.

Further existing rate limiting systems can implement a rate limiting approach that pre-allocates a percentage of a total rate to each consuming node. These systems require separate tracking nodes for tracking and allocating processing rates among processing nodes. Every processing node updates its processing rate on the tracking nodes at configured intervals. Among these processing nodes, a leader is selected as a coordinator node. The coordinator reallocates new processing rates to processing nodes at configured intervals based on the processing nodes' previous processing rates. The coordinator node can also allocate higher processing rates to faster processing nodes and lower rates to slower processing nodes. These systems, though, suffer due to the designation of tracking nodes and coordinator nodes, which consumes additional system resources that could be used for processing requests at processing nodes. Further, additional problems (e.g., split-brain syndrome) can arise when nodes in these systems fail.

BRIEF DESCRIPTION OF THE DRAWINGS

To facilitate further description of the embodiments, the following drawings are provided in which:

FIG. 8 illustrates representative pseudocode instructions, according to a representative embodiment.

Figure 1:
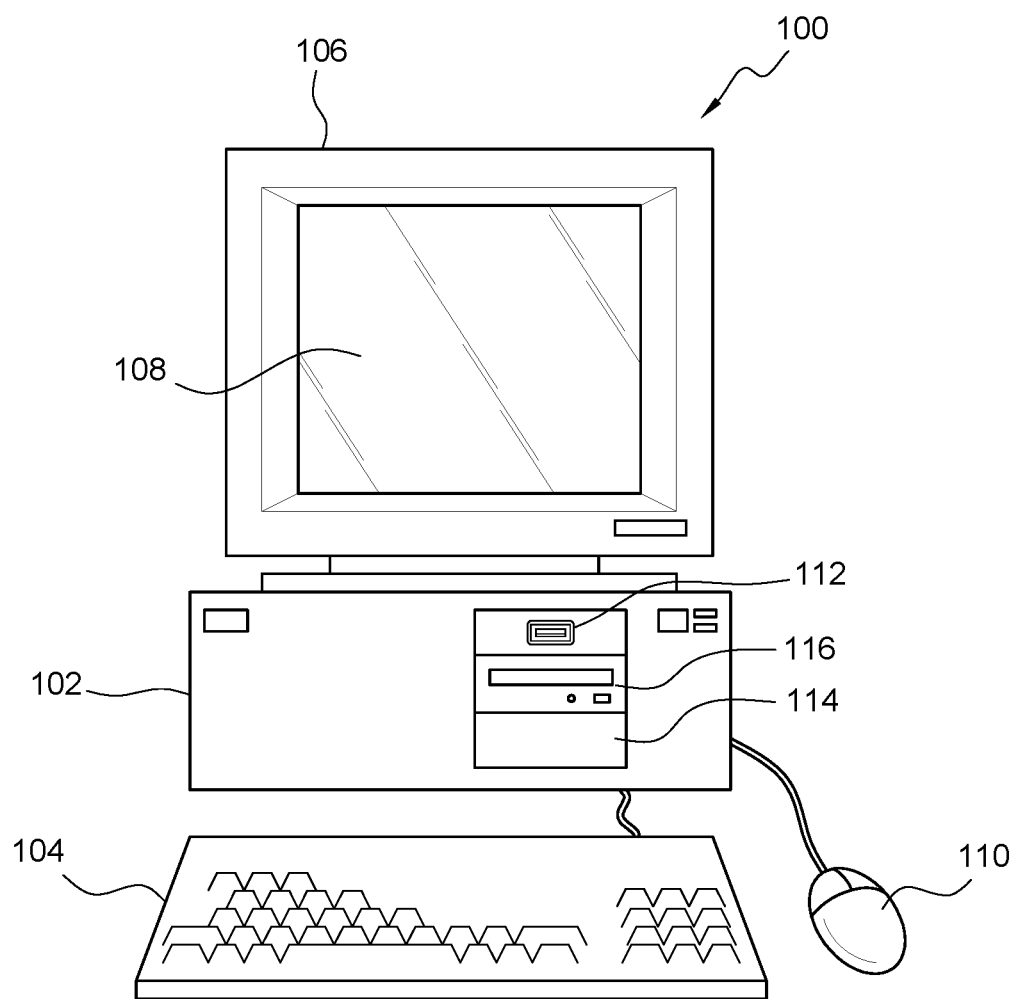
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of receiving one or more processing requests; assigning each respective processing request of the one or more processing requests to a respective queue of one or more queues; assigning each respective queue of the one or more queues to a respective processing node of one or more processing nodes; calculating a respective processing request backlog for each respective processing node of the one or more processing nodes; and limiting a processing rate of the respective processing node for processing requests of the one or more processing requests of the respective queue based on the respective processing request backlog for the respective processing node.

Various embodiments include a method. The method can be implemented via execution of computing instructions configured to run at one or more processors and configured to be stored at non-transitory computer-readable media The method can comprise receiving one or more processing requests; assigning each respective processing request of the one or more processing requests to a respective queue of one or more queues; assigning each respective queue of the one or more queues to a respective processing node of one or more processing nodes; calculating a respective processing request backlog for each respective processing node of the one or more processing nodes; and limiting a processing rate of the respective processing node for processing requests of the one or more processing requests of the respective queue based on the respective processing request backlog for the respective processing node.

Figure 2:
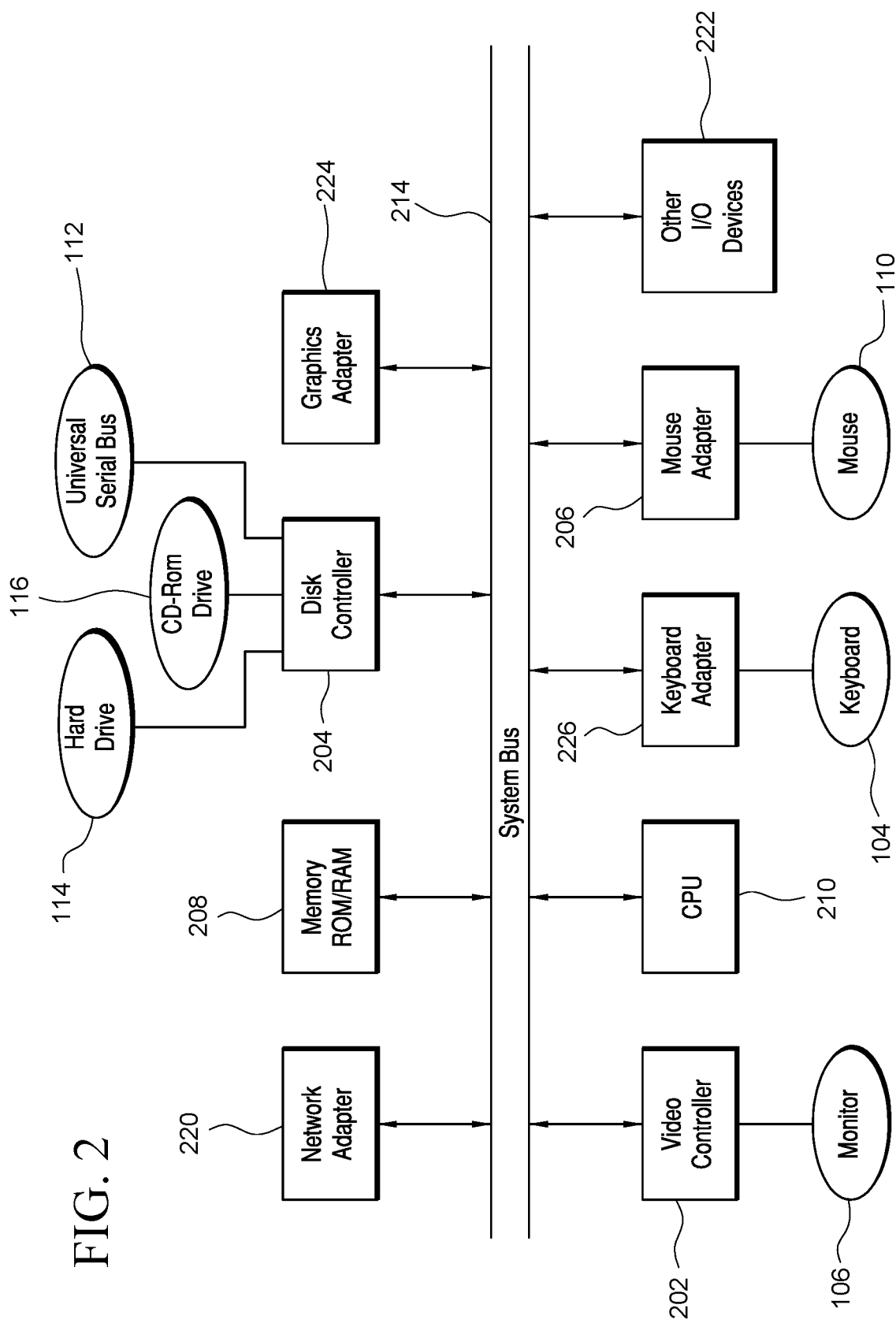
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
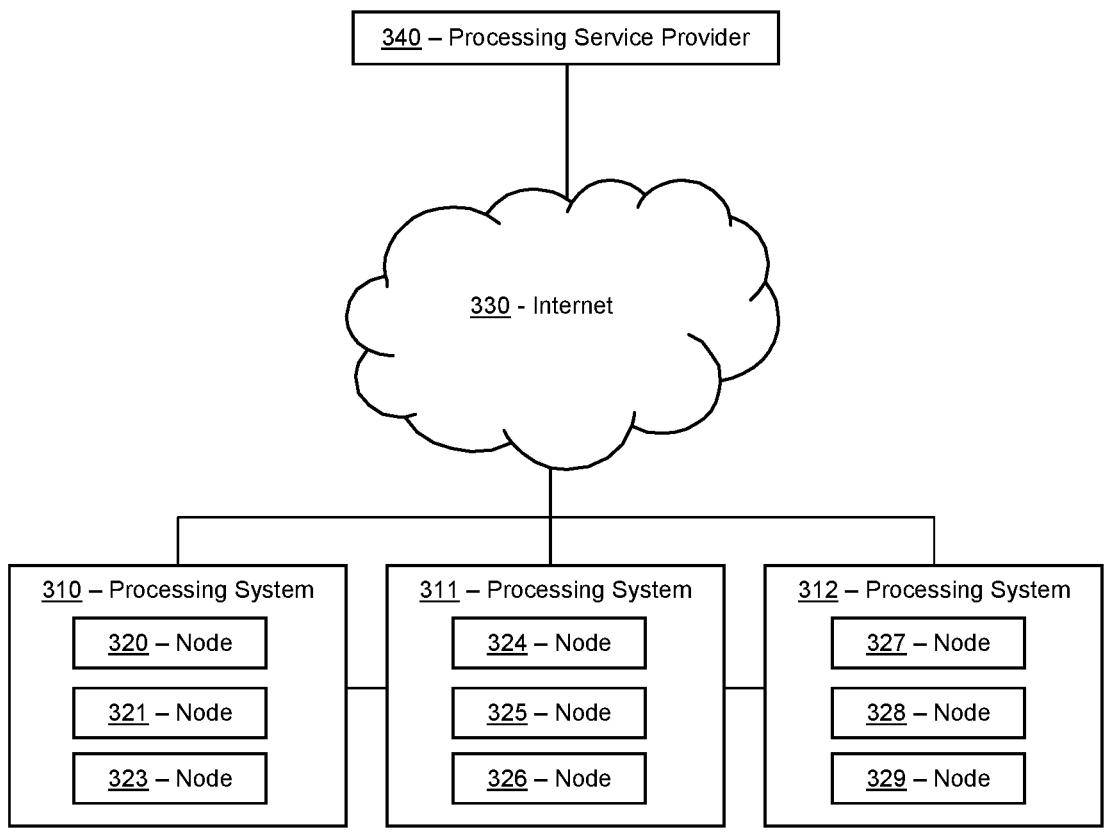
FIG. 3 illustrates a representative block diagram of a system, according to an embodiment.

Turning ahead in the drawings, FIG. 3 illustrates a block diagram of a system 300 that can be employed for rate limiting of processing systems, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more processing systems 310-312, one or more processing nodes (i.e. nodes) 320-329, and/or one or more processing service providers 340. Processing systems 310-312, nodes 320-329, and/or processing service provider 340 can each be a computer system, such as computer system 100 (FIG. 1), as described above, and can each be a single computer, a single server, or a cluster or collection of computers or servers, or a cloud of computers or servers. In another embodiment, a single computer system can host each of or two or more of processing systems 310-312, nodes 320-329, and/or processing service provider 340. In some embodiments, nodes 320-329 can each comprise a processor (e.g., CPU 210), a core within a multi-core processor, and/or a mixture of both. Additional details regarding processing systems 310-312, nodes 320-329, and/or processing service provider 340 are described herein.

In many embodiments, processing service provider 340 is external to system 300. In some embodiments, processing service provider 340 can be a cloud service provider. A cloud service provider can be a company that offers network services, infrastructure, storage, and/or software applications in the cloud (e.g., via Internet 330). For example, a cloud service provider can offer Software as a Service (SaaS), a computing platform for developing or hosting software applications, known as Platform as a Service (PaaS), and/or an entire networking or computing infrastructure, known as Infrastructure as a Service (IaaS). Exemplary cloud service providers are Amazon Web Services, Microsoft Azure, and/or Google Cloud Platform.

In many embodiments, processing systems 310-312, nodes 320-329, and/or processing service provider 340 can be one or more mobile electronic devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, processing systems 310-312, nodes 320-329, and/or processing service provider 340 can comprise one or more graphical user interfaces ("GUIs"). In the same or different embodiments, a GUI can be part of and/or displayed by processing systems 310-312, nodes 320-329, and/or processing service provider 340. In some embodiments, a GUI can comprise text and/or graphics (image) based user interfaces. In the same or different embodiments, a GUI can comprise a heads up display ("HUD"). When a GUI comprises a HUD, the GUI can be projected onto glass or plastic, displayed in midair as a hologram, or displayed on monitor 106 (FIG. 1). In various embodiments, a GUI can be color or black and white. In many embodiments, a GUI can comprise an application running on a computer system, such as processing systems 310-312, nodes 320-329, and/or processing service provider 340. In the same or different embodiments, a GUI can comprise a website accessed through internet 330 (e.g., a website of processing service provider 340). In some embodiments, a GUI can comprise an eCommerce website. In these or other embodiments, a GUI can comprise an administrative (e.g., back end) GUI allowing an administrator to modify and/or change one or more settings in system 300. In the same or different embodiments, a GUI can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, processing systems 310-312, nodes 320-329, and/or processing service provider 340 can be in data communication through Internet 330. In certain embodiments, processing systems 310-312, nodes 320-329, and/or processing service provider 340 can host one or more websites. For example, processing systems 310-312 and/or nodes 320-329 can host an eCommerce website that allows users to browse and/or search for products, to add products to an electronic shopping cart, and/or to purchase products, in addition to other suitable activities.

In many embodiments, processing systems 310-312, nodes 320-329, and/or processing service provider 340 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) processing systems 310-312, nodes 320-329, and/or processing service provider 340 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of processing systems 310-312, nodes 320-329, and/or processing service provider 340. In a similar manner, the processing module(s) and the memory storage module(s) can be local and/or remote to each other.

In various embodiments, Internet 330 can be an intranet that is not open to the public. In further embodiments, Internet 330 can be a mesh network of individual systems. Accordingly, in many embodiments, processing systems 310-312, nodes 320-329, and/or processing service provider 340 (and/or the software used by such systems) can refer to a back end of system 300 operated by an operator and/or administrator of system 300. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, processing systems 310-312, nodes 320-329, and/or processing service provider 340 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between processing systems 310-312, nodes 320-329, and/or processing service provider 340, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, one or more of processing systems 310-312, nodes 320-329, and/or processing service provider 340 can comprise a synchronous processing system. In a synchronous processing system, inbound requests are processed as they are received. A newer request for a request thread cannot be processed until a previous request is processed by a processing node.

Figure 6:
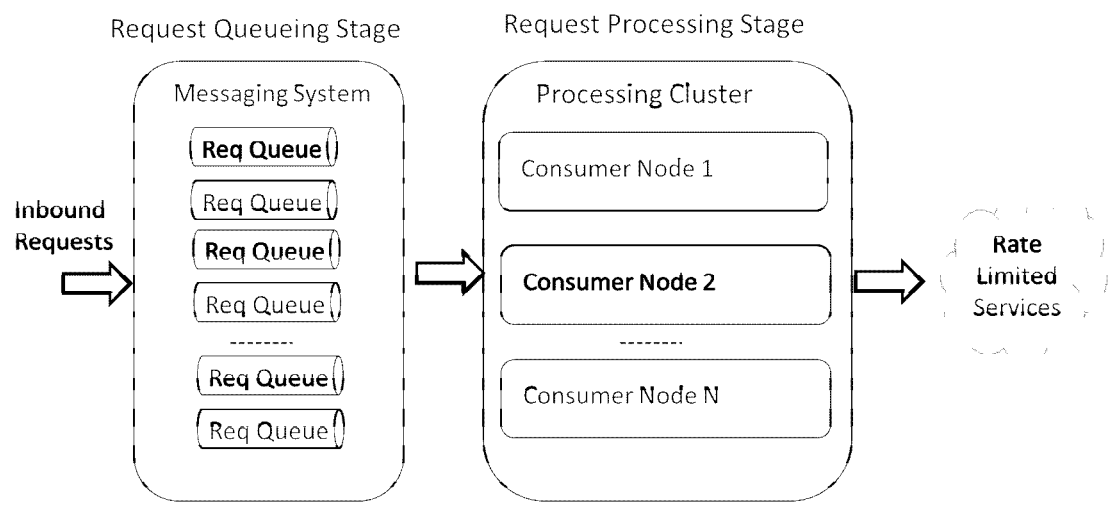
FIG. 6 illustrates an exemplary flowchart for a system, according to an embodiment.

In many embodiments, one or more of processing systems 310-312, nodes 320-329, and/or processing service provider 340 can comprise an asynchronous processing system. A flowchart for an exemplary asynchronous processing system is shown in FIG. 6. Asynchronous processing systems can generally operate in two stages. First, in the request queuing stage, inbound requests can be stored in the hard disk or RAM module of the system. Requests can also be distributed, sorted, and/or stored among or onto one or more queues so that the requests can be processed in parallel by one or more processing nodes (i.e., consumer nodes) pursuant to the rate limit. Some asynchronous processing systems ensure that messages in each queue are stored and retrieved in the same order, thereby allowing requests that have been pending the longest to be processed first. For scalability, an asynchronous message system can have multiple queues. Next, in the request processing stage, one or more nodes retrieve requests from request queues, and then process the requests in parallel. In some asynchronous processing systems, queues can be assigned to dedicated nodes. In other words, in these embodiments, a queue can be assigned to only one node for processing.

In many embodiments, the techniques described herein can provide a practical application and several technological improvements. In some embodiments, the techniques described herein can provide for more efficient processing of processing requests in rate limited systems. These techniques described herein can provide a significant improvement over conventional approaches of processing of processing requests in rate limited systems, such as token/counter systems and/or pre-allocating processing rates. In many embodiments, the techniques described herein can beneficially make determinations based on dynamic information that describes current conditions and/or conditions that have occurred during operation (e.g., a large influx of processing requests and/or a failure of a node). In this way, the techniques described herein can avoid problems with uneven distribution of processing requests or split-brain syndrome.

In a number of embodiments, the techniques described herein can solve a technical problem that arises only within the realm of computer networks, as processing service providers do not exist outside the realm of computer networks.

Figure 4:
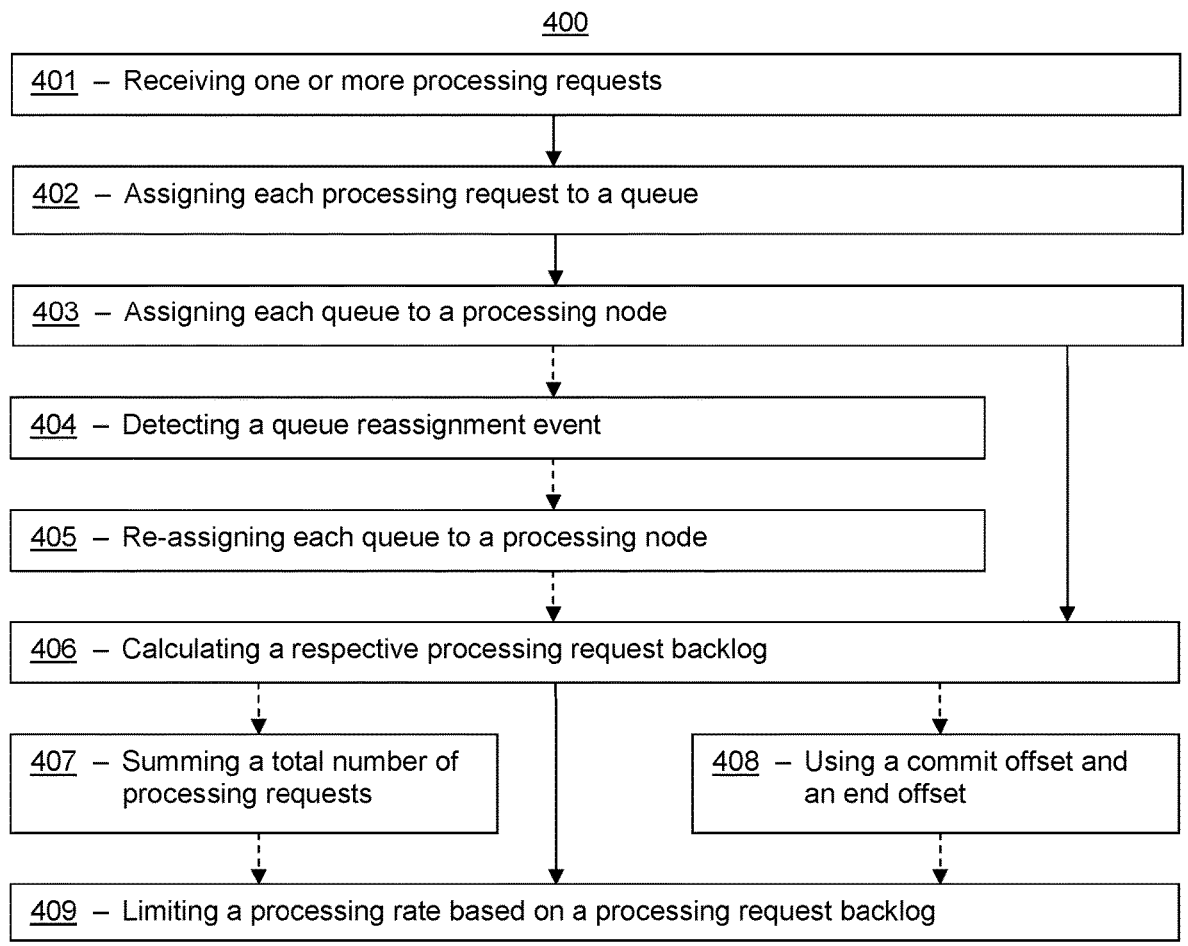
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as processing systems 310-312, nodes 320-329, and/or processing service provider 340 (FIG. 3). The processing module(s) can be similar or identical to the processing module(s) described above with respect to computer system 100 (FIG. 1).

In many embodiments, method 400 can comprise an activity 401 of receiving one or more processing requests. In some embodiments, a processing request can comprise a request for one or more of processing systems 310-312 (FIG. 3), nodes 320-329 (FIG. 3), and/or processing service provider 340 (FIG. 3) to perform a computational operation. For example, a processing request can be all or a part of a request to send or retrieve a message in an automated messaging system, display a website, process an order, display an advertisement, etc.

In many embodiments, method 400 can comprise an activity 402 of assigning each processing request to a queue. In some embodiments, assigning each processing request to a queue can comprise saving a request to one or more storage devices of a computer system (e.g., system 100 (FIG. 1)). In various embodiments, a processing request can be assigned to a queue based on a hash value of a request. In these or other embodiments, a hash value of a request can comprise a number computed from specific fields of a request. In many embodiments, a hash value can be used to assign a queue to a request using a mathematical function configured to maps a value in the hash value domain to a number that identifies a queue. For example, a hash value domain can be divided into a number of evenly disjoint ranges, and each queue can be assigned to a disjoint set of these ranges.

Figure 7:
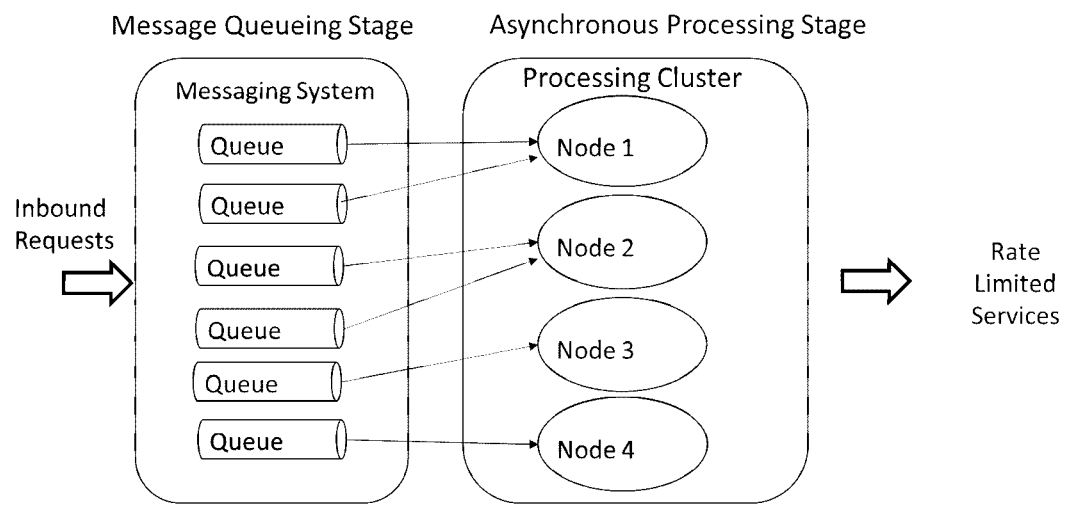
FIG. 7 illustrates an exemplary flowchart for a system, according to an embodiment.

In many embodiments, method 400 can comprise an activity 403 of assigning each queue to a processing node. In some embodiments, queues can be assigned exclusively to one or more processing nodes. For example, the messaging system flowchart displayed in FIG. 7 contains six request queues, and the processing system contains four nodes. The first two nodes are each assigned to two queues, and the last two nodes are assigned one queue each. In some embodiments, processing systems do not support automatic queue assignment. In these embodiments, an administrator can identify an exclusive subset of queues to assign to processing nodes.

Queue re-assignment can be computationally expensive because every node needs to complete in-progress requests, clear up its locally buffered waiting requests, and subscribe to newly assigned queues. In embodiments where nodes are assigned multiple queues, this expense is increased. Therefore, in some embodiments, method 400 can comprise an optional activity 404 of detecting a queue re-assignment event. In various embodiments, a queue re-assignment event can comprise an event that has the potential to cause one or more nodes to approach or break/exceed a rate limit. In some embodiments, a queue re-assignment event can comprise a failure of one or more processing nodes, a recovery of one or more processing nodes, a removal of one or more processing nodes, an addition of one or more processing nodes and/or a scaling of a processing system.

In many embodiments, method 400 can optionally comprise an activity 405 of re-assigning each queue to a processing node. In some embodiments, activity 405 can be performed after one or more of activities 403 or 404. In various embodiments, activity 404 can be performed after activity 409, thereby re-assigning queues that have been re-assigned at least once before. In this way, a processing system can dynamically shift queue assignment in response to changing circumstances, and further improve the processing efficiency of the system.

In various embodiments, queue re-assignment can be performed by range. For example, M queues in a system be represented by a range of consecutive numbers (e.g., from 0 to M−1). The range can then be divided evenly into subranges. These subranges can then be assigned to processing nodes. In some embodiments, range division can change due to a queue re-assignment event. In many embodiments, one or more active nodes can determine their queue assignment by obtaining a sequence of numbers in the range. In some embodiments, this sequence is consecutive. For example, Table 1 below shows queue assignment in an embodiment with twelve queues and three active nodes.

TABLE 1

| Node Number | Queue Number Range | Queue Numbers |
|---|---|---|
| 1 | [11, 8] | 11, 10, 9, 8 |
| 2 | [7, 4] | 7, 6, 5, 4 |
| 3 | [3, 0] | 3, 2, 1, 0 |

In many embodiments, activity 405 can use one or more data stores comprising one or more of: a total range size M, a shared counter G, a shared remainder counter R, or a range allocation record ("RAR"). In various embodiments, M can comprise a total number of request queues in a processing system. In these or other embodiments, G can be initialized to a very large number. For example, G can be set to a maximum value available for a system or a maximum value of a 64-bit integer. In this way, G can function as a counter while avoiding (1) becoming negative or (2) falling below M. In some embodiments, R can be initialized and/or updated after a queue re-assignment event or after a queue re-assignment is completed. In various embodiments, a RAR can comprise one or more of: an iteration number I, a lowest value of G allowed $G_l$, a number of active nodes $N_i$, or a timestamp of a latest queue re-assignment event $T_i$. In some embodiments, I can comprise a number of times a queue re-assignment event has been detected or a number of times queues have been re-assigned. In these or other embodiments, $G_l$ can be determined by subtracting M from G (i.e., G-M). In many embodiments, $N_i$ can be determined at each iteration. In various embodiments, these records can be stored in a data store that supports repeatable read and/or a higher transaction isolation level (e.g., MySql).

In many embodiments, activity 405 can use one or more node status records. In some embodiments, a node status record can be updated periodically by each node and/or a cluster of nodes. In various embodiments, a node status record can comprise a timestamp of a most recent node status change $t_m$ and/or a number of active nodes in a cluster N. In many embodiments, a background task in a node checks the one or more node status records. In various embodiments, a node can check the one or more node status records periodically. In these or other embodiments, a background task can detect one or more conditions: (1) when $t_m$ is newer than $T_i$ on a RAR or (2) N in a node status record is greater than zero. In many embodiments, detection of the one or more conditions can initiate an iteration of a range allocation algorithm.

In many embodiments, activity 405 can comprise using a range allocation algorithm. In some embodiments, a range allocation algorithm can be configured to reallocate a range of a node, as described above with reference to activity 404. In these or other embodiments, a range allocation algorithm can reset R such that R=M % N. In other words, R is a remainder of M modulo N. In many embodiments, R can be an integer. In various embodiments, R can be calculated using a formula comprising:

$$R = \left(M - \left(\frac{M}{N}\right)N\right).$$

In many embodiments, a range allocation algorithm can update a RAR. In these or other embodiments, updating a RAR can comprise one or more of: incrementing I, setting $T_i$ equal to $t_m$ for a node record, setting $N_i$ equal to N for a node record, and/or setting $G_l$ equal to G-M.

In many embodiments, one or more nodes can cache its last successful range allocation iteration value locally. When a node detects a newer iteration value on a RAR, it can determine a new range. In embodiments where a node cannot detect a new value on the RAR, it retains the latest version of the RAR. In many embodiments, determining a new range for a node can comprise determining a floor of a size S of the new range that the node can process. In some embodiments, S can be determined by dividing M by $N_i$.

In many embodiments, a range allocation algorithm can further comprise obtaining a new range for a node and updating G. In these or other embodiments, obtaining a new range can comprise one or more steps of the pseudocode shown in FIG. 8, which displays data in a shared data store in capital letters, local data in lowercase letters, and comments begin using double backslashes ("//") and end with a period ("."). When a node successfully allocates a new range, it updates a latest iteration number locally, and can convert the new range to a list of positive numbers. Each positive number can correspond to a queue number. In some embodiments, a new range can be converted to positive numbers by adding M to each negative value to get a final value. For example, Table 2 shows a range allocation with M=12 and N=3. Node 1 has a range allocation of [1, −2], which corresponds to a list of 1, 0, −1, −2, and is later adjusted to 1, 0, 11, 10.

TABLE 2

| Node Number | Queue Number Range | Queue Numbers | New Queue Numbers |
|---|---|---|---|
| 1 | [1, −2] | 1, 0, −1, −2 | 1, 0, 11, 10 |
| 2 | [9, 6] | 9, 8, 7, 6 | 9, 8, 7, 6 |
| 3 | [5, 2] | 5, 4, 3, 2 | 5, 4, 3, 2 |

In some embodiments, each node can further implement a handler program that revokes old queue assignments and records and re-assigns new queues.

Returning now to FIG. 4, in many embodiments, after activity 403 and/or optional activities 404 and 405, method 400 can comprise an activity 406 of calculating a respective processing request backlog. In many embodiments, a processing request backlog can be calculated for a node and/or a processing system. In various embodiments, a request backlog can be calculated periodically by a background process. In these or other embodiments, a request backlog can be calculated in optional activity 407 by summing a number of requests in all queues.

In some embodiments, though, a request management program (e.g., Apache Kafka) does not remove requests from queues (e.g., partitions) after they are completed. In these systems, a numerical offset for each request in a queue is maintained. For example, a first request saved in a queue has an offset of 0, a second request has an offset 1, an $n_{th}$ request has an offset of n-1, etc. In some embodiments, an end offset on a queue is an offset of a newest request saved in the queue. In these or other embodiments, a commit offset can comprise an offset of a most recently processed request. In these embodiments, a request backlog can be calculated in optional activity 408 by using a commit offset and an end offset. In many embodiments, a commit offset can be obtained from each queue that is assigned to a node. In these or other embodiments, a commit offset for each queue can be determined after completing a batch of requests. In various embodiments, a node can request a commit offset from a request management program. In many embodiments, a node can locally cache a commit offset once it is determined for each queue and/or transmit the commit offset to a request management program for storage. In various embodiments, an end offset for each queue can be obtained from the request management program. In these or other embodiments, a request backlog can be calculated by taking the difference between the end offset and the commit offset. Backlogs for each queue assigned to a node can then be summed to determine a total backlog for the node.

In many embodiments, after activity 406 and/or optional activities 407 or 408, method 400 can further comprise an activity 409 of limiting a processing rate based on a processing request backlog. In various embodiments, a processing request backlog can comprise one or more of a total system backlog and/or a node backlog. In some embodiments, a ration of a global rate limit allocated to a system and/or a node can be determined based on a processing request backlog. In many embodiments, limiting a processing rate can be performed locally at a system and/or a node level. In many embodiments, limiting a processing rate can comprise using a local rate limit counter to limit rates at a node or system level. In these or other embodiments, rate limiting is performed at configured intervals and/or upon detection of a queue re-assignment event by a background task running on a system or node. In various embodiments, a background task can refresh a system's and/or node's rate limit counter by setting it equal to a local rate limit. In many embodiments, a local rate limit can be calculated using one or more variables comprising a global rate limit ("global_rate_limit"), a number of requests in queues assigned to a node ("num_reqs_consumer"), a number of requests in a system to process ("num_reqs_total"), and/or the local rate limit ("local_rate_limit"). In these embodiments, $$local\_rate\_limit = \frac{global\_rate\_limit \times num\_reqs\_consumer}{num\_reqs\_total}.$$

In these or other embodiments, a request can be processed only when a local rate counter is positive. In many embodiments, a local rate counter is decremented after a request is processed. In various embodiments, a local rate limit counter is refreshed periodically to a positive number by a background task, thereby allowing local rate limiting to have very little effect on request processing flow. In some embodiments, individual nodes can process requests with a batch size up to a remaining value of a local rate limit counter. After completing the batch of requests, the local rate limit counter decreases by the request batch size.

In many embodiments, processing nodes and/or systems calculate their rate limit rations in synchrony. In this way, all calculations are based on a unified system view. In some embodiments, processing nodes and/or systems calculate their rate limiting rations at a beginning of a time interval (e.g., beginning of every 10 seconds, or beginning of a minute). In various embodiments, processing systems and/or nodes can synchronize internal clocks in order to simultaneously calculate their rate limit rations. In many embodiments, internal clocks can be synchronized to a millisecond level.

Figure 5:
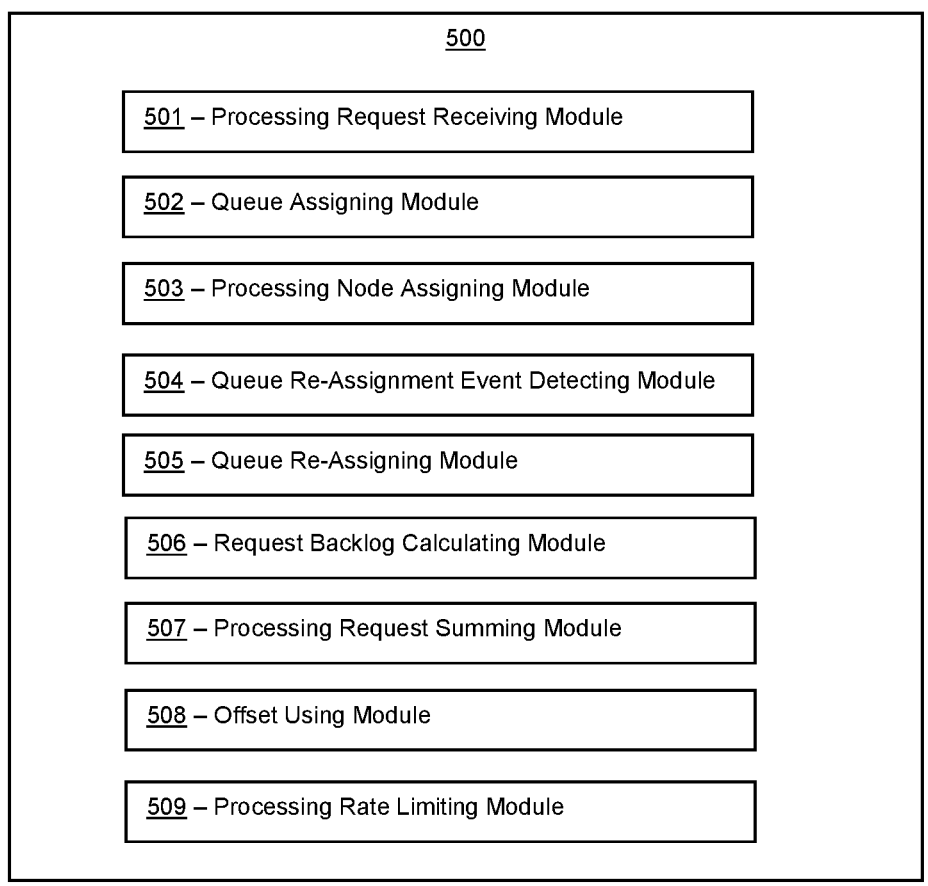
FIG. 5 illustrates a representative block diagram of a system, according to an embodiment.

Turning ahead in the drawings, FIG. 5 illustrates a block diagram of a system 500 that can be employed for rate limiting of processing systems. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as processing request receiving module 501. In many embodiments, processing request receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as queue assigning module 502. In many embodiments, queue assigning module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as processing node assigning module 503. In many embodiments, processing node assigning module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as queue re-assignment event detecting module 504. In many embodiments, queue re-assignment event detecting module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as queue re-assigning module 505. In many embodiments, queue re-assigning module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as request backlog calculating module 506. In many embodiments, request backlog calculating module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as processing request summing module 507. In many embodiments, processing request summing module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as offset using module 508. In many embodiments, offset using module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as processing rate limiting module 509. In many embodiments, processing rate limiting module 509 can store computing instructions configured to run on one or more processing modules and perform one or more acts of method 400 (FIG. 4) (e.g., activity 409 (FIG. 4)).

Although systems and methods for rate limiting of processing systems have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable storage devices storing computing instructions configured to run on the one or more processors and cause the one or more processors to perform:
   receiving one or more processing requests;
   assigning each respective processing request of the one or more processing requests to a respective queue of one or more queues;
   assigning each respective queue of the one or more queues to a respective processing node of one or more processing nodes;
   calculating a respective processing request backlog for each respective processing node of the one or more processing nodes using a commit offset and an end offset; and
   limiting a processing rate of the respective processing node for processing requests of the one or more processing requests of the respective queue based on the respective processing request backlog for the respective processing node.

2. The system of claim 1, wherein assigning each respective queue to the respective processing node comprises:
   re-assigning the respective queue to a different one of the one or more processing nodes.

3. The system of claim 2, wherein re-assigning the respective queue to the different one of the one or more processing nodes occurs only when a queue re-assignment event is detected.

4. The system of claim 3, wherein the queue re-assignment event comprises:
   (1) a processing node of the one or more processing nodes recovers;
   or
   (2) the processing node of the one or more processing nodes is added to the system by an administrator.

5. The system of claim 3, wherein the queue re-assignment event is detected by the respective processing node of the one or more processing nodes.

6. The system of claim 1, wherein limiting the processing rate of the respective processing node is performed by the respective processing node of the one or more processing nodes.

7. The system of claim 6, wherein limiting the processing rate of the respective processing node is performed by an automated background process running on the respective processing node of the one or more processing nodes.

8. The system of claim 6, wherein:
   the one or more processing nodes comprise two or more processing nodes; and
   each respective processing node of the two or more processing nodes limits its own processing rate in synchrony with other processing nodes of the two or more processing nodes.

9. The system of claim 1, wherein calculating the respective processing request backlog for a particular processing node of the one or more processing nodes comprises summing a total number of processing requests of the one or more processing requests assigned to a particular queue of the one or more queues assigned to the particular processing node.

10. The system of claim 3, wherein the queue re-assignment event comprises at least one of:
   (1) a failure of a processing node of the one or more processing nodes; or
   (2) a removal of the processing node of the one or more processing nodes from the system by an administrator.

11. A method implemented via execution of computing instructions configured to run at one or more processors and configured to be stored at non-transitory computer-readable media, the method comprising:
   receiving one or more processing requests;
   assigning each respective processing request of the one or more processing requests to a respective queue of one or more queues;
   assigning each respective queue of the one or more queues to a respective processing node of one or more processing nodes;
   calculating a respective processing request backlog for each respective processing node of the one or more processing nodes using a commit offset and an end offset; and
   limiting a processing rate of the respective processing node for processing requests of the one or more processing requests of the respective queue based on the respective processing request backlog for the respective processing node.

12. The method of claim 11, wherein assigning each respective queue to the respective processing node comprises:
   re-assigning the respective queue to a different one of the one or more processing nodes.

13. The method of claim 12, wherein re-assigning the respective queue to the different one of the one or more processing nodes occurs only when a queue re-assignment event is detected.

14. The method of claim 13, wherein the queue re-assignment event comprises:
   (1) a processing node of the one or more processing nodes recovers;
   or
   (2) the processing node of the one or more processing nodes is added by an administrator.

15. The method of claim 13, wherein the queue re-assignment event is detected by the respective processing node of the one or more processing nodes.

16. The method of claim 11, wherein limiting the processing rate of the respective processing node is performed by the respective processing node of the one or more processing nodes.

17. The method of claim 16, wherein limiting the processing rate of the respective processing node is performed by an automated background process running on the respective processing node of the one or more processing nodes.

18. The method of claim 16, wherein:
   the one or more processing nodes comprise two or more processing nodes; and
   each respective processing node of the two or more processing nodes limits its own processing rate in synchrony with other processing nodes of the two or more processing nodes.

19. The method of claim 11, wherein calculating the respective processing request backlog for a particular processing node of the one or more processing nodes comprises summing a total number of processing requests of the one or more processing requests assigned to a particular queue of the one or more queues assigned to the particular processing node.

20. The method of claim 13, wherein the queue re-assignment event comprises at least one of:
   (1) a failure of a processing node of the one or more processing nodes; or
   (2) a removal of the processing node of the one or more processing nodes from a system by an administrator.

* * * * *